Figure 1:
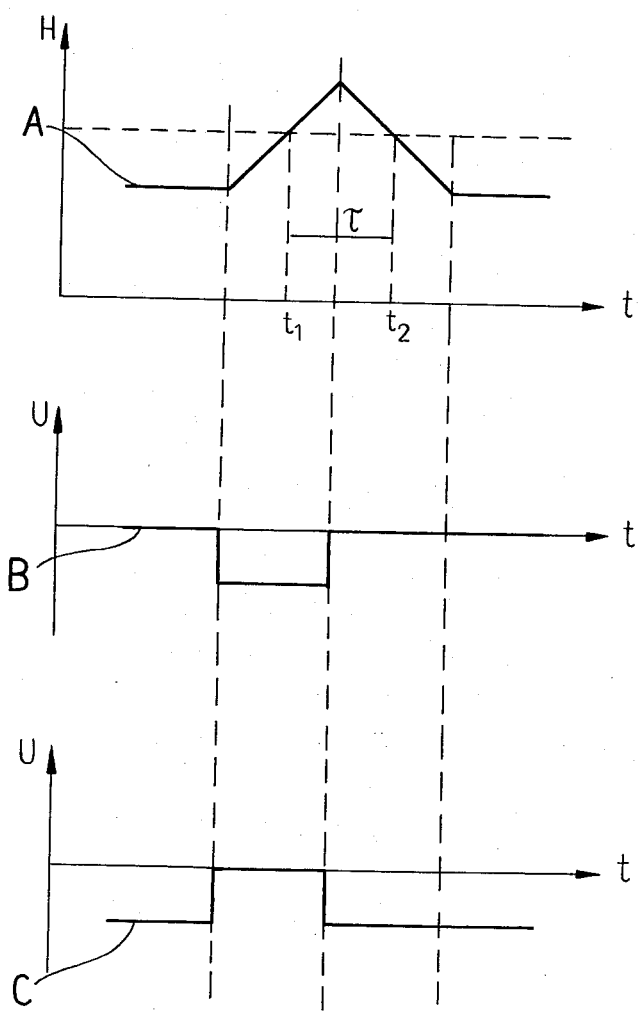

United States Patent [19]
Pajak et al.

[11] 3,714,551
[45] Jan. 30, 1973

[54] METHOD FOR MEASURING THE DISTRIBUTION OF MAGNETIC NUCLEAR RELAXATION TIMES

[75] Inventors: Zdzislaw Pajak, Poznan; Kazimiera Jurga, Koscian; Jan Jurga, Poznan, all of Poland

[73] Assignee: Uniwersytet im. Adama Mickiewicza u Pozaniu, Poznan ul. Stalingradzka, Poland

[22] Filed: Feb. 5, 1971

[21] Appl. No.: 113,027

Related U.S. Application Data

[63] Continuation of Ser. No. 56,391, July 20, 1970, abandoned.

[30] Foreign Application Priority Data

July 18, 1969  Poland ........................... P 134.921

[52] U.S. Cl. .................................................324/.5 R
[51] Int. Cl. ................................................G01n 27/78
[58] Field of Search .........324/.5 A, .5 R, .5 G, .5 AC

[56] References Cited

UNITED STATES PATENTS 3,568,047   3/1971   Look ...................................324/.5 R

OTHER PUBLICATIONS

E. L. Hahn, An Accurate Nuclear Magnetic Resonance Method for Measuring Spin–Lattice Relaxation Times, Physical Rev., 76(1), July 1, 1949, pp. 145, 146.

*Primary Examiner*—Michael J. Lynch
*Attorney*—Stevens, Davis, Miller & Mosher

[57]  ABSTRACT

A method of measuring distribution of nuclear magnetic spin-lattice relaxation times in the spectrum of nuclear magnetic resonance using a standard high resolution spectrometer in which two successive transitions are made through resonance at modulation of a constant magnetic field at strong and weak levels. A time interval between the transitions is chosen to equal the product of the relaxation time and the natural logarithm of two.

3 Claims, 2 Drawing Figures

METHOD FOR MEASURING THE DISTRIBUTION OF MAGNETIC NUCLEAR RELAXATION TIMES

The present application is a continuation of our application Ser. No. 56,391, filed July 20, 1970 now abandoned.

The present invention relates to a method for measuring the distribution of magnetic nuclear spin-lattice relaxation times of separate groups of nuclei chemically shifted in nuclear magnetic resonance.

There are several known methods of measuring relaxation time distributions of nuclei in nonequivalent sites using high resolution nuclear magnetic resonance spectrometers. These methods fall in the following groups:

1. Methods consisting in the utilization of rapid adiabatic transitions, in which a single-level, high-frequency, strong magnetic field of the order of millioersteds (mOe) is applied. Based on the observation of signal amplitudes of nuclear magnetic resonance, the relaxation times of particular groups of chemically shifted nuclei can be determined. These methods, however, contain a limitation caused by the presence of the strong high-frequency field. Such a field causes a broadening of the various nuclear magnetic resonance lines thereby strongly reducing the resolving power of the spectrometer. For these reasons, the above-mentioned methods can be used only in measuring the relaxation times of compounds presenting large chemical shifts. (E. W. Nederbragt, C. A. Reilly, J. Chem. Phys., 24, 1110 /1956/. J. G. Powles, Berichte der Bunsen Gesellschaft fur physikalische Chemie, 67, 328 /1963/.)

2. Pulse methods resorting to spin-echo. These methods require highly complex equipment and a complicated measuring technique. (S. Alexander, Rev. Sci. Instr., 32, 1066 /1961/. H. Kamei, Japan J. Appl. Phys., 6, 1471 /1967/.)

3. A method in which a constant magnetic field is maintained at the peak of the line, and the strength of the high-frequency field is then increased to cause saturation of the line. When the strength of the high-frequency field is then decreased to a non-saturating value, the signal begins to grow with a time constant proportional to the relaxation spin-lattice time $T_1$; this permits determination of the relaxation time. This method requires very high stability of the magnetic field. (A. L. Van Geet, D. N. Hume, Anal. Chem., 37, 983 /1965/.)

4. A method enabling the measurement of relaxation spin-lattice and spin-spin times. When measuring relaxation spin-lattice times, a high-frequency field with two strength levels is employed. The strong high-frequency field causes an inversion of the magnetization vector and a first rapid adiabatic transition across the resonance line. The next transitions follow periodically in a weak high-frequency field, the entire operation being repeated a number of times, and the recorded counted signals are time-averaged. This method permits obtaining accurate results and is applied in measurements of relaxation times of nuclei of low concentration. It is, however, difficult to manipulate and requires complex equipment, including electronic storage systems, and a complicated measuring technique. (J. E. Anderson, J. Steele, A. Warnick, Rev. Sci. Instr., 38, 1139 /1967/.)

5. Another known method, of very low accuracy, enables in some particular cases measurement of only two different relaxation times of nuclei in nonequivalent sites using a low resolution spectrometer. (G. Bonera, L. Chiodi, G. Lanzi, A. Rigamonti, Nuovo Cimento, 17, 198 /1960/.)

The disadvantage of the above methods consists in the fact that they are limited to measurements of relaxation times of nuclei with very large chemical displacements, or require complex equipment and the application of scaling circuits or a high stability of the constant magnetic field strength, and yield a low accuracy.

Besides, if in measurements of relaxation times the signal amplitudes are to be measured also, a high stability and linearity of the whole receiver system is indispensable.

The object of this invention is to provide a method of measurement of the magnetic spin-lattice relaxation times of groups of nuclei chemically shifted in nuclear magnetic resonance, using a standard high resolution magnetic resonance spectrometer.

According to the present invention, the method consists in the following for a given substance, only two transitions through resonance are made, using a high frequency field with two strength levels, namely a strong field of the order of millioersteds (mOe), and a weak field of the order of micro-oersteds ($\mu$Oe).

After detection in the weak high-frequency field, in any well known way, of the signals of nuclear magnetic resonance of the substance, containing groups of nuclei in nonequivalent sites, the symmetrical modulation for the group is established and is subjected to measurement of the spin-lattice relaxation time, denoted by the symbol $T_1$, and then the time $T_1$ is measured.

The measurement of the time $T_1$ as such consists in establishing a proper time interval $\tau$ between two successive transitions through resonance occurring during modulation of the constant magnetic field.

During the first half-period of the modulation, the sample is acted on by the strong high-frequency field which, at the moment of the first transition through resonance in point $t_1$, performs an inversion of the magnetization vector.

During the second half-period of modulation, the sample is acted on by the weak high-frequency field only.

The time $\tau$ between the two transitions is chosen so that the following equality shall be fulfilled: the time $\tau$ equals the product of the relaxation time $T_1$ and the natural logarithm of two, as represented by the formula $\tau = T_1 \cdot \log_n 2$, from which the relaxation time $T_1$ is determined. When the equality $\tau = T_1 \cdot \log_n 2$ is fulfilled, one observes a fading of the amplitude of the signal of nuclear magnetic resonance of the given group of nuclei at the second transition through resonance in the point $t_2$.

The inventive method of measurement is characterized by a number of valuable and hitherto unachieved advantages.

The proposed solution provides the possibility of measuring the times of magnetic relaxation of chemically shifted nuclei of any chemical compound, using a standard magnetic nuclear resonance spectrometer with high resolving power destined for nuclear magnetic resonance analyses and provided additionally with an electronic circuit involving electric elements currently used in other applications.

Moreover, the measurement is direct and rapid, is based on simple techniques, and ensures the highest accuracy of the results. A possible non-linearity of the receiving system and the absence of zero level stability do not affect the accuracy of measurement.

The means for accomplishing the foregoing objects and other advantages, which will be apparent to those skilled in the art, are set forth in the following specification and claims, and are illustrated in the accompanying drawings dealing with a basic embodiment of the present invention. Reference is made now to the drawings in which:

FIG. 1 shows the waveforms of the time functions $t$ wherein: A is the strength H of the modulated constant magnetic field; B is the pulse of the voltage controlling the operation of the preamplifier and receiving set; and C is the pulse of the voltage controlling the operation of the power amplifier of the high-frequency field; and FIG. 2 is a schematic block diagram of some spectrometer elements in a Bloch circuit supplemented with an additional electronic circuit.

Figure 2:
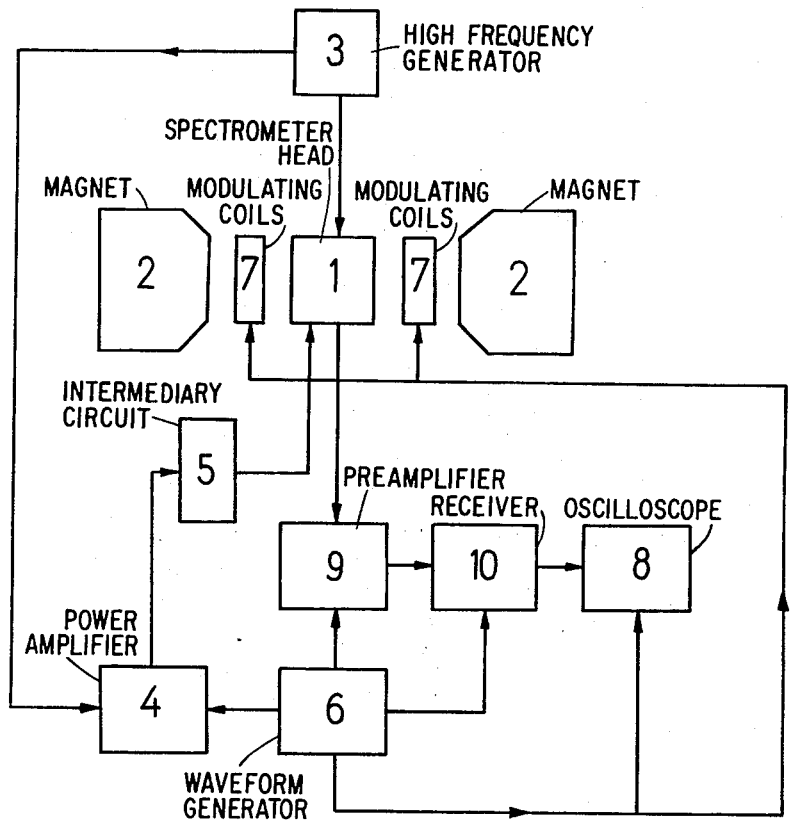

Turning now to the block diagram of FIG. 2, the spectrometer head 1 is located in the gap between the magnetic poles 2. The spectrometer head is a Bloch circuit head and includes a system of emitter coils and a receiving coil in which the substance to be tested is placed. The magnet 2 produces a uniform magnetic field in the gap between the poles. A high frequency generator 3 supplies the emitter coils in the head 1 of the spectrometer with a high frequency field of low strength. Coils 7 are also located in the gap and serve to modulate the magnetic field. Power amplifier 4 produces a strong high-frequency field in the receiving coil of the spectrometer head.

Wave form generator 6 produces voltage pulses as shown in FIG. 1. Pulse A is used for symmetrical modulation of the magnetic field by means of coils 7 and for controlling the time base of the oscilloscope. Pulse B is used for blocking the preamplifier 9 and receiver 10.

The signals of nuclear paramagnetic resonance from the spectrometer head 1 are first amplified in preamplifier 9, further amplified and detected in receiver 10, and displayed for viewing on the oscilloscope 8.

In order to perform a measurement of the relaxation time $T_1$ of a chosen group of nuclei, an additional electronic circuit is connected to the spectrometer; this electronic circuit consists of the intermediary circuit 5 having two small capacity condensers and connected in series between the amplifier 4 and the receiving coil of the head 1.

The strong high-frequency field from the power amplifier is supplied to the receiving coil through the capacitive intermediary circuit 5 for the duration of the first half-period of modulation of the constant magnetic field. The action of the strong high-frequency field causes an inversion of the magnetization vector at the moment of the first transition through resonance at point $t_1$. During the first half-period of modulation of the magnetic field, the pulse B will block the preamplifier 9 and receiver 10. During the second half-period of modulation of the field, the sample is subjected to the action of the weak high-frequency field only, since the power amplifier 4 is blocked by the pulse C.

During the second transition through resonance at point $t_2$, a signal of nuclear paramagnetic resonance can be observed, because in the second half-period modulation of the constant magnetic field both the preamplifier and receiver are released by means of the pulse B.

The time interval $\tau$ between the two transitions through resonance are chosen so that the signal from the group of nuclei under investigation shall disappear at the moment of the second transition through resonance; this can be followed on the screen of the oscilloscope tube of the receiver 10.

The fading of the signal denotes that the chosen time interval fulfills the relation expressed by the formula:

$$\tau = T_1 \cdot \log_n 2,$$

permitting determination of the relaxation time $T_1$ of the group of chemically shifted nuclei under investigation. The time $\tau$ interval between transitions is obtained directly from readings of the waveform generator 6, of a type such as the Scivomex L. F. 51.

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

What is claimed:

1. A method of measuring magnetic spin-lattice relaxation times of groups of nuclei chemically shifted in nuclear magnetic resonance, using a standard high resolution magnetic resonance spectrometer, comprising the steps of:

producing a uniform magnetic field in the gap between a pair of magnetic poles;

symmetrically modulating said magnetic field;

supplying a first high-frequency magnetic field to receiving coils of said spectrometer head located in the gap between said pair of magnetic poles during a first half period of modulation of said uniform magnetic field;

supplying a second high-frequency magnetic field to emitter coils of said spectrometer head during a second half period of modulation of said uniform magnetic field, said first field having a substantially higher field strength than said second field;

determining the time interval $\tau$ between two successive transitions through resonance of said groups of nuclei; and adjusting said time interval to fulfill the following equality:

$$\tau = T_1 \cdot \log_n 2,$$

where $T_1$ is equal to the relaxation time of a group of chemically shifted nuclei.

2. The method according to claim 1, comprising the further steps of: generating a triangular voltage of regulated pulse duration, and supplying said triangular voltage to said modulating coils.

3. The method according to claim 1 wherein the first transition through resonance takes place at a point $t_1$ in the first half-period of modulation of the constant magnetic field, when the strong high-frequency field is acting, whereas in the second half-period of modulation the second transition through resonance occurs at a point $t_2$, when only the weak high-frequency field is acting.

* * * * *